UNITED STATES PATENT OFFICE.

JOHN W. HYATT, JR., OF ALBANY, NEW YORK, ASSIGNOR TO THE HYATT MANUFACTURING COMPANY, OF SAME PLACE.

IMPROVED MOLDING COMPOSITION TO IMITATE IVORY AND OTHER SUBSTANCES.

Specification forming part of Letters Patent No. 88,633, dated April 6, 1869; antedated March 25, 1869.

*To all whom it may concern:*

Be it known that I, JOHN W. HYATT, Jr., of the city and county of Albany and State of New York, have invented a new and useful Improvement in Molding Compositions; and I do hereby declare that the following is a full, clear, and exact description of the method of compounding and using the same.

The object of my invention is to produce a composition which is adapted for being molded into a variety of useful forms, while in a dry state, or as free as possible from moisture, and which, when properly molded, as will be hereinafter explained, will serve as a good substitute for ivory in the manufacture of billiard-balls, and balls or articles of various descriptions, wherein it is desired to obtain toughness, hardness, and elasticity, as will be hereinafter explained.

The following is a description of my improved molding composition, and a method of using it.

Take any kind of fibrous vegetable, animal, or even mineral matter, such, for instance, as paper, leather-chips, or asbestus, and reduce the same to a very fine state, so that the fibers can be intimately and thoroughly mixed with a pulverized substance.

I have been very successful in the use of paper-pulp or paper reduced by grinding to a very fine flock, but do not confine myself to the use of this substance, as almost any fibrous substance will answer the purpose when properly reduced. I also use gum-shellac, or any other solid, fusible, and adhesive gum or substance, which may be found to answer the required purpose, and reduce the same to a very fine powder.

This cement I thoroughly intermix with the fibrous substance, both being in as dry a state as possible.

The proportions of the cementing substance to the fibrous material are about equal in quantity by weight, although I do not confine myself to these proportions, as they will vary according to the solidity and strength required of the molded articles.

In the process of molding this composition in useful forms, I apply heat and pressure. The heat is designed to fuse the shellac or other cementing substance used in the compound, and to cause it to cement the small fibers firmly together, and form a solid homogeneous body, and to this end such a degree of heat as will effect this result should be applied. The pressure, which is applied simultaneously with the heat, is designed to compress and pack together the fibers throughout the mass, and thus produce a very dense body. It is also important during the operation of molding to keep the article under pressure until it has set, or, in other words, until the fusible cement is cool and hard. This will prevent expansion, and cause the article or object molded to retain the required shape and size.

If desirable, the specific gravity of the article or articles can be regulated by the use of white lead or other suitable pigment mixed in suitable quantities with the compound before it is molded.

While I do not confine myself to any particular construction or form of mold in which to produce different articles of my composition, I prefer to adopt molds which are made sectional, and so that the composition can be compressed in different directions, thereby causing the fibers to arrange themselves so as to afford, when cemented together, the greatest degree of strength to the object when molded.

I do not claim, broadly, a molding composition consisting of a fibrous matter and a fusible cement, as such substances have heretofore been compounded, but not in the manner herein set forth.

From the foregoing description it may be apparent that if my dry compound is subjected to heat and pressure simultaneously, a perfect union between the respective dry particles will take place from center to circumference of the ball being molded, for the reason that the different fine or ground substances thereof attain a relation to one another when dry which they cannot attain when plastic and sticky. Besides this, the action of heat and pressure upon such a plastic mass is not, during the act of molding, sufficient to dry the article from center to circumference, and consequently when the article is removed and allowed to dry, not under pressure, it becomes porous about the center, and is very readily cracked or broken. This is not so when the compound is molded dry, for the heat simply liberates and softens the shellac sufficiently to make it serve as a cementing agent upon nearly every particle of matter composing the compound.

What I claim as my invention, and desire to secure by Letters Patent, is—

Making a dry compound, such as described, and subjecting it to heat and pressure simultaneously within a mold, which shapes or forms the billiard-ball or other article, substantially as described.

JOHN W. HYATT, Jr.

Witnesses:
R. V. CAMPBELL,
JULIUS HIRSCH.